(12) United States Patent
Correal et al.

(10) Patent No.: US 7,570,927 B2
(45) Date of Patent: Aug. 4, 2009

(54) DECENTRALIZED WIRELESS COMMUNICATION NETWORK AND METHOD HAVING A PLURALITY OF DEVICES

(75) Inventors: Neiyer S. Correal, Cooper City, FL (US); Spyros Kyperountas, Weston, FL (US); Qicai Shi, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 552 days.

(21) Appl. No.: 11/424,622

(22) Filed: Jun. 16, 2006

(65) Prior Publication Data

US 2007/0293237 A1 Dec. 20, 2007

(51) Int. Cl.
H04B 3/36 (2006.01)
H04B 1/38 (2006.01)
H04B 7/14 (2006.01)
H04M 11/00 (2006.01)

(52) U.S. Cl. ............... 455/90.1; 455/7; 455/17; 455/406; 455/422; 455/428; 370/352

(58) Field of Classification Search ........... 455/90.1, 455/17, 509, 445, 437, 455, 7, 422, 444, 455/450, 406, 500, 428; 370/352

See application file for complete search history.

(56) References Cited

U.S. PATENT DOCUMENTS

| | | | |
|---|---|---|---|
| 4,313,036 A | | 1/1982 | Jabara et al. |
| 4,534,061 A | * | 8/1985 | Ulug ............... 455/17 |
| 5,079,767 A | | 1/1992 | Perlman |
| 5,128,938 A | | 7/1992 | Borras |
| 5,241,542 A | | 8/1993 | Natarajan et al. |
| 5,278,831 A | | 1/1994 | Mabey et al. |
| 5,371,734 A | | 12/1994 | Fischer |
| 5,418,835 A | | 5/1995 | Frohman et al. |
| 5,533,100 A | | 7/1996 | Bass et al. |
| 5,590,396 A | | 12/1996 | Henry |
| 5,722,082 A | * | 2/1998 | Schloemer ............... 455/509 |
| 5,740,366 A | | 4/1998 | Mahany et al. |
| 5,778,052 A | | 7/1998 | Rubin et al. |
| 5,793,842 A | * | 8/1998 | Schloemer et al. .......... 455/445 |
| 5,797,094 A | | 8/1998 | Houde et al. |
| 5,845,204 A | | 12/1998 | Chapman et al. |
| 5,850,592 A | | 12/1998 | Ramanathan |
| 5,905,958 A | * | 5/1999 | Houde ................. 455/437 |
| 5,940,771 A | | 8/1999 | Gollnick et al. |
| 5,943,397 A | | 8/1999 | Gabin et al. |

(Continued)

OTHER PUBLICATIONS

Gerla, et al., "Multicluster, Mobile, Multimedia Radio Network", Wireless Networks 1, 1995, 255-265, ULCA, USA.

(Continued)

Primary Examiner—William D Cumming
(74) Attorney, Agent, or Firm—Daniel K. Nichols; John T. Bretscher

(57) ABSTRACT

A wireless communication system and method for determination of the location of a location-incapable device of a decentralized wireless communication network. Upon receipt of location determination information, relevant to the location of the location-incapable device in the network and sufficient to perform a calculation of the location of the location-incapable device, a location-capable device of the network may calculate the location of the location-incapable device and make this information available to one or more devices of the network.

26 Claims, 8 Drawing Sheets

U.S. PATENT DOCUMENTS

| | | | |
|---|---|---|---|
| 5,991,287 | A | 11/1999 | Diepstraten et al. |
| 6,044,069 | A | 3/2000 | Wan |
| 6,047,200 | A | 4/2000 | Gibbons et al. |
| 6,055,561 | A | 4/2000 | Feldman et al. |
| 6,058,289 | A | 5/2000 | Gardner et al. |
| 6,134,599 | A | 10/2000 | Chiu et al. |
| 6,138,019 | A | 10/2000 | Trompower et al. |
| 6,192,230 | B1 | 2/2001 | Van Bokhorst et al. |
| 6,205,122 | B1 | 3/2001 | Sharon et al. |
| 6,208,623 | B1 | 3/2001 | Rochberger et al. |
| 6,236,662 | B1 | 5/2001 | Reilly |
| 6,259,772 | B1 | 7/2001 | Stephens et al. |
| 6,269,404 | B1 | 7/2001 | Hart et al. |
| 6,285,892 | B1 | 9/2001 | Hulyalkar |
| 6,304,556 | B1 | 10/2001 | Haas |
| 6,351,522 | B1 | 2/2002 | Vitkainen |
| 6,356,538 | B1 | 3/2002 | Li |
| 6,370,146 | B1 | 4/2002 | Higgins et al. |
| 6,374,078 | B1* | 4/2002 | Williams et al. ............... 455/7 |
| 6,377,987 | B1 | 4/2002 | Kracht |
| 6,385,174 | B1 | 5/2002 | Li |
| 6,385,201 | B1 | 5/2002 | Iwata |
| 6,418,299 | B1 | 7/2002 | Ramanathan |
| 6,456,599 | B1 | 9/2002 | Elliott |
| 6,457,048 | B2 | 9/2002 | Sondur et al. |
| 6,473,038 | B2 | 10/2002 | Patwari et al. |
| 6,473,408 | B1 | 10/2002 | Rochberger et al. |
| 6,480,719 | B1* | 11/2002 | Schloemer et al. .......... 455/450 |
| 6,493,759 | B1 | 12/2002 | Passman et al. |
| 6,609,000 | B1* | 8/2003 | Arnold ....................... 455/406 |
| 6,625,462 | B1* | 9/2003 | Arnold ....................... 455/500 |
| 6,636,499 | B1 | 10/2003 | Dowling |
| 6,694,361 | B1 | 2/2004 | Shah et al. |
| 6,745,038 | B2 | 6/2004 | Callaway, Jr. et al. |
| 6,807,158 | B2 | 10/2004 | Krishnamurthy et al. |
| 6,816,460 | B1 | 11/2004 | Ahmed et al. |
| 6,829,222 | B2 | 12/2004 | Amis et al. |
| 6,836,463 | B2 | 12/2004 | Garcia-Luna-Aceves et al. |
| 6,842,617 | B2* | 1/2005 | Williams et al. ............ 455/444 |
| 6,845,091 | B2 | 1/2005 | Ogier et al. |
| 6,859,831 | B1 | 2/2005 | Gelvin et al. |
| 6,873,848 | B2* | 3/2005 | Schloemer .................. 455/445 |
| 6,876,643 | B1 | 4/2005 | Aggarwal et al. |
| 6,889,254 | B1 | 5/2005 | Chandra et al. |
| 6,973,053 | B1 | 12/2005 | Passman et al. |
| 6,980,524 | B1 | 12/2005 | Lu et al. |
| 6,982,960 | B2 | 1/2006 | Lee et al. |
| 7,024,181 | B2* | 4/2006 | Savilaakso ............... 455/414.2 |
| 7,085,560 | B2* | 8/2006 | Petermann ............... 455/422.1 |
| 7,106,219 | B2* | 9/2006 | Pearce ................... 340/995.13 |
| 7,248,853 | B1* | 7/2007 | Sakarya .................... 455/404.1 |
| 7,286,828 | B2* | 10/2007 | Schloemer .................. 455/445 |
| 2001/0024955 | A1* | 9/2001 | Schloemer .................. 455/445 |
| 2002/0018448 | A1 | 2/2002 | Amis et al. |
| 2002/0031131 | A1 | 3/2002 | Yemini et al. |
| 2002/0052198 | A1* | 5/2002 | Savilaakso .................. 455/422 |
| 2002/0137517 | A1* | 9/2002 | Williams et al. ............ 455/444 |
| 2002/0169846 | A1 | 11/2002 | Chen et al. |
| 2003/0012168 | A1 | 1/2003 | Elson et al. |
| 2004/0077347 | A1* | 4/2004 | Lauber et al. ............... 455/428 |
| 2004/0090950 | A1* | 5/2004 | Lauber et al. ............... 370/352 |
| 2004/0203931 | A1 | 10/2004 | Karaoguz |
| 2004/0224695 | A1* | 11/2004 | Schloemer .................. 455/446 |
| 2005/0096034 | A1* | 5/2005 | Petermann ............... 455/422.1 |
| 2005/0099321 | A1* | 5/2005 | Pearce ................... 340/995.13 |
| 2005/0186966 | A1 | 8/2005 | Belcea |
| 2005/0201301 | A1 | 9/2005 | Bridgelall |
| 2005/0201340 | A1* | 9/2005 | Wang et al. ................. 370/337 |
| 2005/0228613 | A1 | 10/2005 | Fullerton et al. |
| 2007/0060141 | A1* | 3/2007 | Kangude et al. ............ 455/445 |
| 2007/0293237 | A1* | 12/2007 | Correal et al. ........... 455/456.1 |
| 2008/0081579 | A1* | 4/2008 | Chen et al. ................ 455/187.1 |
| 2008/0220785 | A1* | 9/2008 | Schloemer .................. 455/445 |
| 2008/0253347 | A1* | 10/2008 | Cordeiro et al. ............. 370/343 |
| 2008/0259811 | A1* | 10/2008 | Cordeiro et al. ............. 370/252 |

OTHER PUBLICATIONS

De Couto, et al., "Location Proxies and Intermediate Node Forwarding for Practical Geographic Forwarding", MIT Laboratory for Computer Science, 1-14, USA.

A. Savvides, et al., "The Bits and Flops of the N-hop Multilateration Primitive For Node Localization Problems", 2002, 10 pages, UCLA, USA.

A. Savvides, et al., "Dynamic Fine-Grained Localization in Ad-Hoc Networks of Sensors", 2001, 166-179, UCLA, USA.

A. Boukerche, "A Simulation Based Study of On-Demand Routing Protocols for Ad hoc Wireless Networks", Simulation Symposium. 2001, Proceedings 34th Annual, Apr. 22-26, 2001, pp. 85-92, USA.

Whay C. Lee, "Topology Aggregation for Heirarchical Routing in ATM Networks", Computer Communication Review, vol. 25, No. 2, Apr. 1995, pp. 82-92, ACM Press, USA.

Hoon Oh, et al., "Communication Architecture and Protocols for Broadcast-Type Mobile Multimedia Ad hoc Networks", MILCOM 2002, Proceedings vol. 1, Oct. 7-10, 2002, pp. 442-447.

M. Chatterjee, et al., "An On-Demand Weighted Clustering Algorithm (WCA) for Ad hoc Networks", Global Telecommunications Conference, 200, GLOBECOM 2000, IEEE vol. 3, Nov. 27-Dec. 1, 2000, pp. 1697-1701.

I. Stojmenovic, et al., "Bluetooth Scatternet Formation in Ad hoc Wireless Networks", www.site.uottawa.ca/-ivan/BSF-survey.pdf, 2005, pp. 1-28.

L. Jiandong, et al., "An Adaptive Cluster Algorithm for a Self-Organizing Communication Network" Global Telecommunications Conference and Exhibition, 1988 (GLOBECOM '88); Nov. 1988, pp. 1653-1656, vol. 3.

Hwa-Chun Lin, et al., A Clustering Technique for Large Multihop Mobile Wireless Networks, IEEE 51st Vehicular Technology Conference Proceedings, 2000, May 2000, pp. 1545-1549, vol. 2.

Feng Yong-Xin, et al., "A Clustering Algorithm Applied to the Network Management on Mobile Ad hoc Network", Proceedings of the International Conference on Info-tech, 2001, Oct. 2001, pp. 626-631, vol. 2.

* cited by examiner

DECENTRALIZED WIRELESS COMMUNICATION NETWORK AND METHOD HAVING A PLURALITY OF DEVICES

FIELD OF THE INVENTION

The present invention relates generally to communication networks and more specifically to the use of location determination methods and structures in wireless communication networks.

BACKGROUND

Peer-to-peer network location resolution is an emerging market within the wireless communication arena. New systems are being developed to find people and/or objects, in various environments. For outdoor environments, there are many solutions such as GPS that can provide reliable location estimates. In building location solutions, however, techniques are still being researched and developed. Many indoor location determination solutions operate on radio frequency signals and require a dense installation of receivers capable of measuring characteristics of the received waveforms that are used to determine the transmitter's location.

Wireless location determination or radiolocalization in Wireless Personal Area Networks (WPANs) is an area receiving increasing attention. Accurate and cost-effective localization is a key application enabler for wireless sensor networks in a variety of applications such as warehousing and manufacturing logistics. Another typical application may be inventory management: An office has a collection of computers, printers, lab equipment, etc. and the office manager would like to know the location of this office equipment at all times. To date, this has been done with portal systems. Examples of wireless network technology that shows promise in addressing many of the shortcomings of current wireless PANs in terms of cost, throughput, and scalability include the 802.15.4/ZigBee standard, Bluetooth, such as Bluetooth 1.0B, and radiotransceivers and wireless sensor devices operable in these technologies.

Wireless sensor devices may often be highly resource constrained, however. Thus, while some devices of the network may have the ability to perform device location determination this may not be the case for a number of the devices of the wireless network. One of the shortcomings of the current wireless PAN solutions is their inability to provide low cost, transparent location determination for devices within the network. Ideally, each device within the network should have the ability to determine its connectivity status and physical location within the network without the use of specialized and expensive hardware and software. Ideally, location determination calculations could be performed without a corresponding reduction in data throughput between devices within the network.

BRIEF DESCRIPTION OF THE DRAWINGS

The novel features believed characteristic of the invention are set forth in the claims. The invention itself, however, as well as a preferred mode of use, and further objects and advantages thereof, will best be understood by reference to the following detailed description of an illustrative embodiment when read in conjunction with the accompanying drawings, wherein:

DETAILED DESCRIPTION

Figure 1:
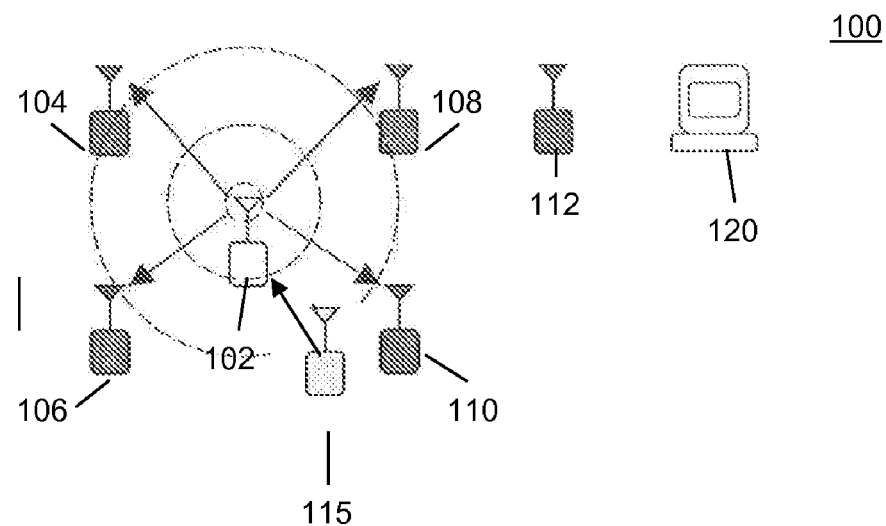
FIGS. 1, 2, 5 and 6 illustrate a wireless network with various devices types, in accordance with embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

Radiolocalization in wireless sensor networks can be performed in a centralized manner where all devices send their range-related waveform measurements to a location server which calculates the location using a location algorithm. A known drawback of a centralized localization approach is the traffic load that data upstream data communication places on the network throughput. Another one is the delay associated with communication with the server. Alternatively, localization can employ another approach in which location determination is performed on-chip using a built-in location solver. In wireless sensor networks, a hardware approach may be preferred to a software solution due to the complexity associated with localization solutions. An example of this approach is the Chipcon CC2431 which incorporates an on-chip location engine core on the device that enables the device to automatically calculate its location. Such a device having on-chip or on-board location determination capability at the device may be referred to as a location-capable device.

In accordance with the present invention, a source-constrained node may outsource or delegate determination of its location to a peer node that has location determination capabilities, such as the built-in on-chip location engine core referenced above. By enabling a resource-constrained node or device to outsource their location calculation functions to a peer node, a more efficient, distributed localization in the wireless network may be realized.

Therefore, in a wireless network, the present invention enables resource-constrained nodes, referred to herein as location-incapable nodes or devices, to delegate the task of determining their location to other peer devices, referred to as location-capable devices or nodes, within the network that are capable of performing location determination calculations. Location determination for resource-constrained or location-incapable nodes or devices by location-capable devices tapped to perform this function allows the network to operate much more quickly and efficiently since it is no longer a requirement that location determination information needed to perform such device location determinations be forwarded to a centralized location server or application.

It is understood that location-incapable devices may encompass devices or nodes incapable of determining their own location as well as devices or nodes of the network that, while capable of determining their location or the location of another device within communication range, decline to do so, for whatever reason. For instance, a device capable of performing location determination calculations may elect to not do so because at the time it is requested to perform the location determination, it needs to behave as a location-incapable device. Such may be the case where it is desirable for the device to offload computational load to save battery, upon detecting a failure of the location calculation block of the device, or other device conditions. Network conditions that might indicate the device wishes to not assume location determination responsibilities could include traffic volume and/or latencies within the network.

It is further understood that the location determination information collected by the location-incapable device and sent to the location-capable device for use in the location determination calculations is relevant to the location of the location-incapable device. The location determination information includes measurements of one or more parameters related to distance received by the location-incapable device as well as location information of location-aware devices communicatively coupled to the location-incapable device, such as within multi-hop range or otherwise within communication range.

There are many measurements that may be made to yield parameters related to distance measurements of the location-incapable node vis-à-vis other devices to which it is communicatively coupled. As an example, consider that the location-incapable node may measure received signal strength (RSS) or time of arrival (TOA); both of these are parameters related to distance of the location-incapable device to one or more location-aware devices to which it may be within communication range (communicatively coupled). Location information of location-aware devices communicatively coupled to the location-incapable device may include the location coordinates of these devices. It should be noted that location-aware nodes or devices encompass any device or node aware of its position in the network. Thus, a reference node given its location coordinates during network commissioning or formation, a location-capable node aware of its position, or even a location-incapable node with knowledge of its location (remember that location-incapable nodes include any device or node either incapable of, unwilling or unable to calculate location determination at a given point in time) are all examples of location-aware devices or nodes.

The location-capable device, then, has a location determination capability, such as a radiolocation hardware engine core, that enables efficient on-chip self-positioning in wireless PANs without the need to consult a central location function, such as a central location server or application capable of determining location for many of the devices of the network. This location determination capability of a location-capable device is utilized as needed by other nodes or devices of the network that either cannot or choose to not calculate their own locations. A resource-constrained node, referred to as a location-incapable node as explained above, will send its measurements along with supplementary information need to calculate location, together referred to as location determination information, to a nearby location-capable device which can then calculate the position of the location-incapable node and report that information. The information is reported back to the location-incapable device so that it then becomes a location-aware node and the location may also be reported to other nodes in the network as well as to a central location function of the network, such as a location server or location application.

Decentralized location calculation is attractive as it reduces the traffic load and the delay incurred by nodes sending their range-related measurements upstream to the centralized location server. All devices or nodes of the network, whether or not they themselves have location-determination capabilities, can easily and efficiently determine their location in the network.

Figure 2:
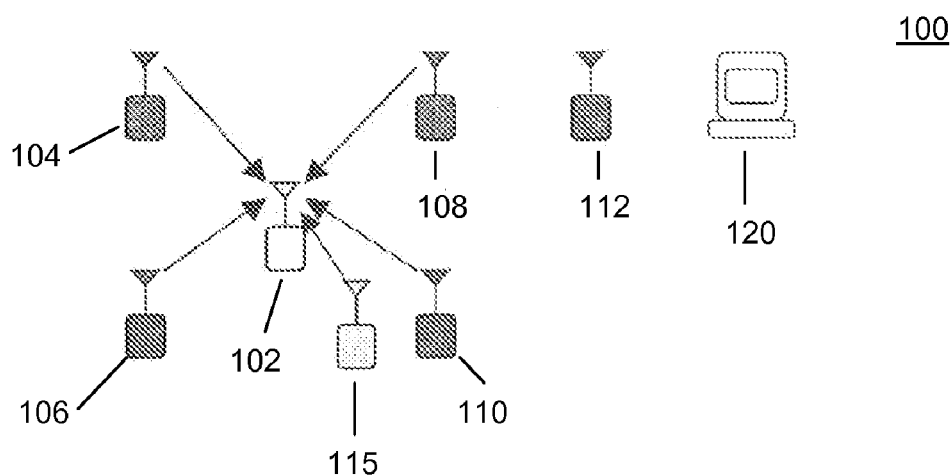

Referring to FIG. 1, an exemplary network 100 containing various devices is illustrated. Device 102 is illustrated as a "blindfolded" or location-incapable node, unaware of its location in the network, and is designated as a white node. Communicatively coupled to device 102 are devices 104, 106, 108, 110, illustrated as black; device 112 is not communicatively coupled to location-incapable device 102. Also in the network 100 is a location function element 120, which may be a location server or a location application. The location element 120 may operate in the network to collect the location information of various devices of the network and/or have location calculation capabilities, such as might be useful in the centralized approach not necessary in accordance with the present invention. FIG. 1 serves to illustrate the location and communication relationships between various devices of the network. It further illustrates the occasion of location-incapable device 102 sending a communication to other devices with which it is communicatively coupled. In an exemplary embodiment, device 102 is sending out a request to devices within its communication range for information about their locations (such as location information and other information relevant for ranging function) as well as requests for messages from these other devices; it is from these messages sent back to it (as shown in FIG. 2) that the location-incapable device 102 may make measurements of parameters related to distance between device 102 and its neighbors, i.e. range-related measurements. Again, as mentioned above, device 102 may be making measurements related to RSS or TOA, for example. AOA (Angle of Arrival) combined with TOA or combinations of TOA, RSS can also be done. Moreover, electromagnetic field measurements may be used as ell. Measurements can be made by listening to beacon messages transmitted by the location-aware devices 104, 106, 108, 110, 115 for the case of RSS or by two-way packet exchanges for the case of TOA measurements. Either type of information gleaned from the return waveforms of FIG. 2, together with the location information of the neighboring devices, may be used by a location determination function to determine the location of location-incapable device 102.

Figure 3:
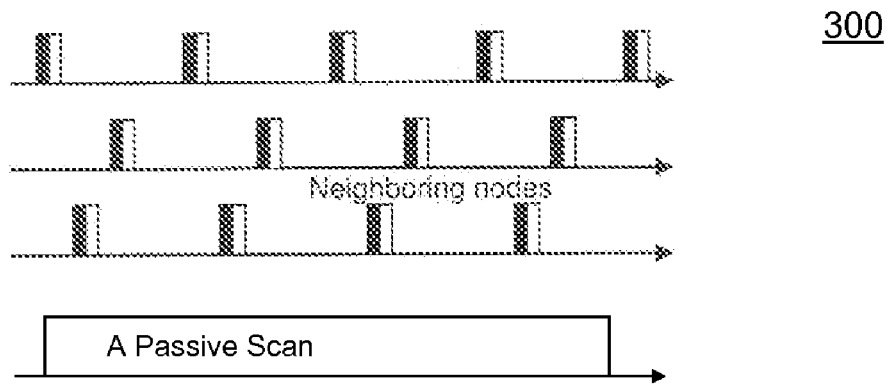
FIG. 3 illustrates a passive scan by a location-incapable device, in accordance with embodiments of the present invention.
Figure 4:
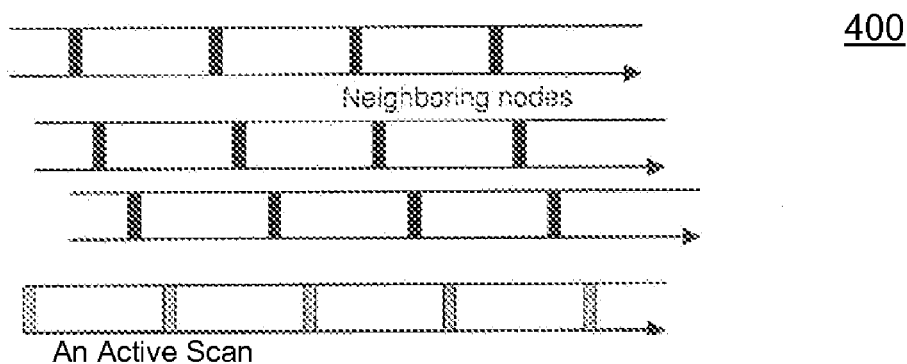
FIG. 4 illustrates an active scan by a location-incapable device, in accordance with embodiments of the present invention.

Location-incapable device 102 performs range-related measurements and receives location information from devices 104, 106, 108, 110 and 115. Receipt of such information may occur in various ways, including by means of a passive scan or an active scan. Referring now to FIG. 3, transmission of beacon or packet information by devices 104, 106, 108, 110, 115 may occur as a result of a passive scan in which device 102 listens for regular message transmissions. Alternately, FIG. 4 illustrates an active scan by device 102 in which device 102 sends a request for message transmissions from neighboring nodes, such as illustrated by FIG. 1 in which device 102 transmits a location data request command, which may be by broadcast or polling, to devices 104, 106, 108, 110.

FIG. 2 also illustrates that another device, device 115 is communicatively coupled to device 102 and indeed is also transmitting its location coordinates as well as waveforms to device 102. Device 115 is a location-capable device in this example and is thus distinguished from other devices communicatively coupled to 102 by its gray-scale appearance.

Figure 5:
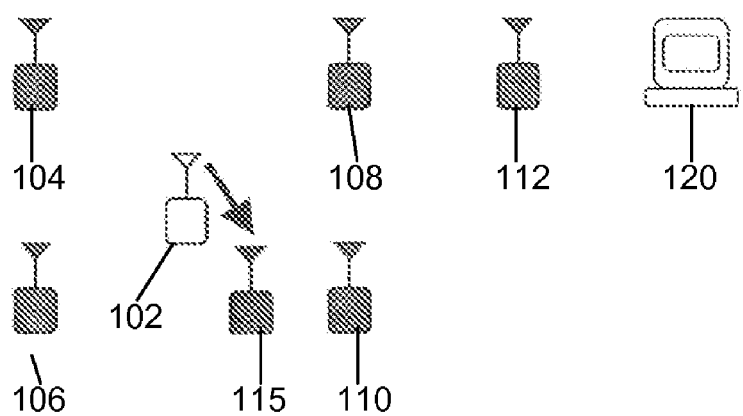

Referring now to FIG. 5, the location-incapable device 102 may now forward its location determination information received from waveform measurements and location data of devices with which it has communicated to location-capable device 115. It is not required that location-capable device 115 be located in the immediate neighborhood of the location-incapable device. Location-capable device 115 uses the location determination information to calculate the location of device 102, or alternately, if device 115 does not wish to or cannot perform this service, it may transmit the location determination information to another location-capable device of the network. At FIG. 6, the calculated location of device 102 is communicated. The location is communicated back to device 102, but may also optionally be communicated to another device of the network, such as device 110 or a location function 120 as shown by the dashed lines.

Figure 7:
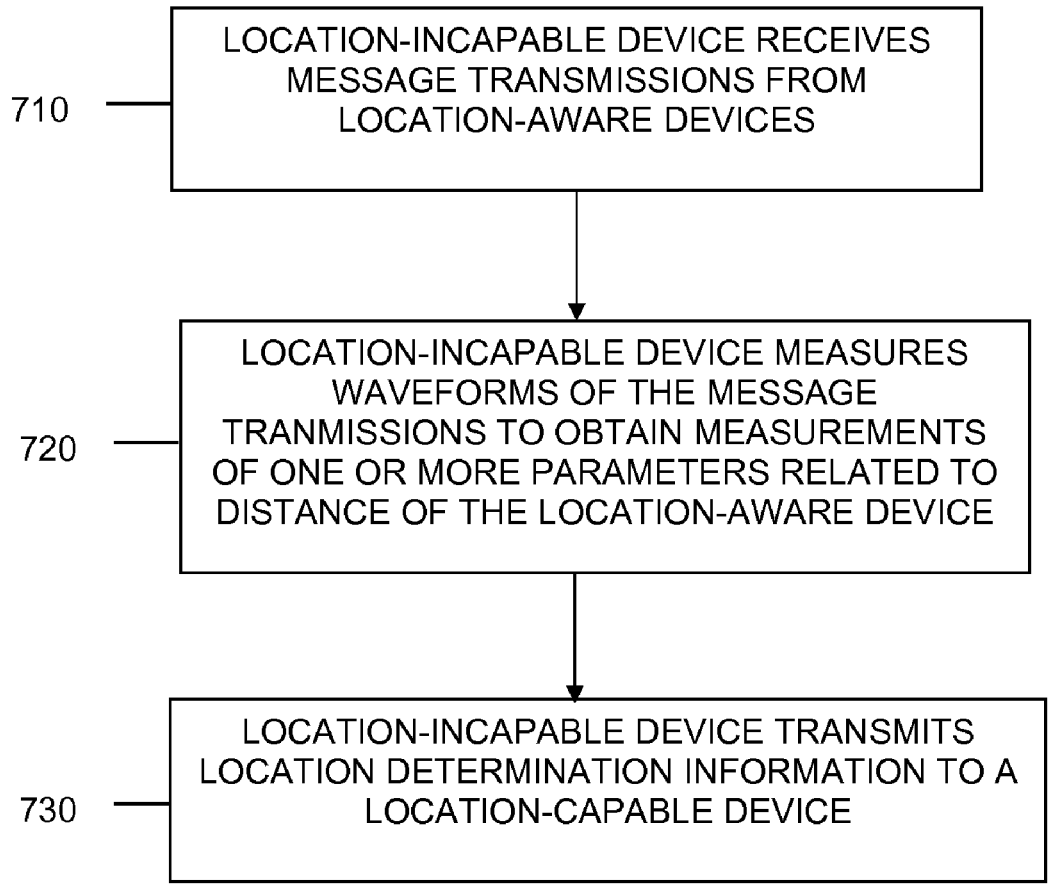
FIGS. 7-9 are flowcharts illustrative of the flows of various devices and a wireless network, in accordance with embodiments of the present invention.
Figure 8:
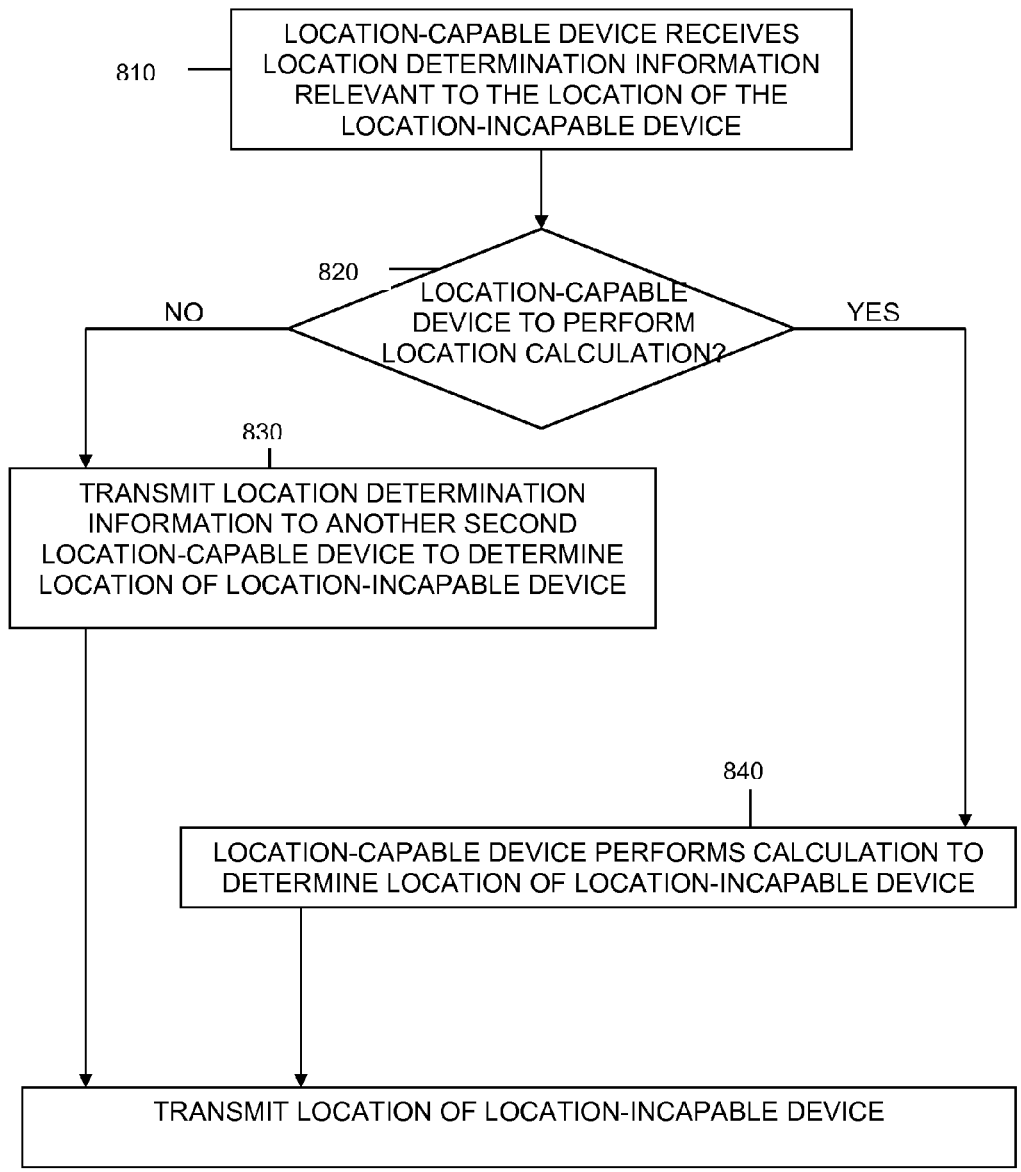
Figure 9:
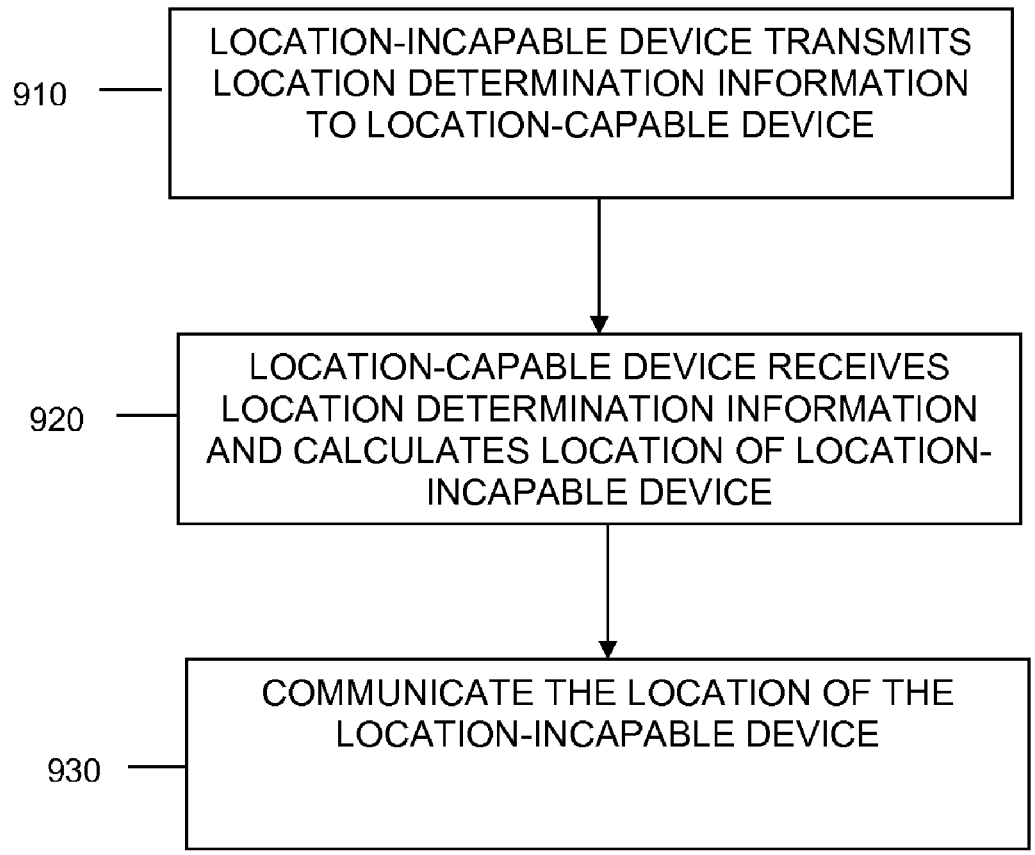

The above description is further illustrated by the flowcharts of FIGS. 7-9. Referring now to FIG. 7, flow 700 illustrates an exemplary flow from the perspective of a location-incapable device. At Block 710, the location-incapable device receives message transmissions from location-aware devices to which it is communicatively coupled. There may be location information embedded in these message that the location-incapable device gets from the message(s). The location-incapable device can then make measurements of the waveforms received from its location-aware neighbors to obtain measurements related to distance at Block 720; again, these measurements may be RSS or TOA directed; TOA and RSS could also be done if desired. At Block 730, the location-incapable device transmits location determination information, relevant to the location of the location-incapable device in the network and sufficient to perform a calculation of the location of the location-incapable device, to the location-capable device.

Figure 6:
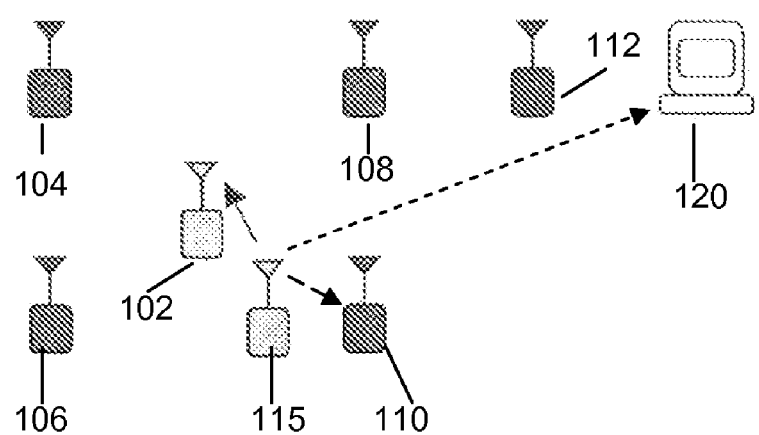

It has been described that the location-incapable device may receive its location calculated by a location-capable device from the location determination information; this is shown in FIG. 6 for example. Moreover, the received waveforms from the location-aware neighbor devices may be the result of active or passive scanning, as described above. In the case of passive scanning, the location-incapable device listens for message transmissions from the one or more location-aware devices, receives message transmissions from them, and then measures waveforms of the received message transmissions from the one or more location-aware devices to obtain the measurements from the location-incapable device to the one or more location-aware devices. In the case of active scanning, the location-incapable device transmits a request for message transmissions from the one or more location-aware devices, receives the requested message transmissions from the location-aware devices, and measures the waveforms of the received message transmissions. Also, it is noted that the location-incapable device may select to transmit the location determination information to the location-capable device on the basis of one or more criteria. Moreover, the location-incapable device may or may not also be a location-aware device of the network. Additionally, the location-capable device may not necessarily be in one hop range of the location-incapable device.

In FIG. 8, a flow 800 from the perspective of a location-capable device is provided. At Block 810, the location-capable device receives location determination information relevant to the location of the location-incapable device in the network. At Decision Block 820, a decision as to whether the location-capable device will undertake the location determination task request is made. If no, then it may transmit the location determination information to another, second location-capable device to determine location of the requesting device at Block 830. Again, conditions under which the location-capable device may decline to undertake the location determination request may include a need for the location-capable device to offload computational load to save its battery life, upon detecting a failure of its location calculation block of the device, or other device condition. Network conditions that might indicate the device wishes to not assume location determination responsibilities could include traffic volume and/or latencies within the network. If yes, then at Block 840, the location-capable device performs the location calculation and has a location determination element or function for this task. At Block 850, the determined location may be communicated. Again, the location will most likely be transmitted back to the requesting, location-incapable device but could also be transmitted to a location function or another device in the network. The location-capable device may or may not also be a location-aware device of the network.

Referring now to FIG. 9, an overall network approach for determining a location of a location-incapable device of a decentralized wireless communication network also having location-aware devices communicatively coupled to the location-incapable device and a location-capable device communicatively coupled to the location-incapable device. At Block 910, the location-incapable device transmits its location determination information to the location-capable device. At Block 920, a location-capable device, which may or may not be the location-capable device to which the location-incapable device directly made its calculation request, receives the location determination information and calculating the location of the location-incapable device in the network. Lastly, at Block 930, the location of the location-incapable device is communicated. The location may be communicated to the location-incapable device, a device of the network, and/or a location function of the network. The location-capable device may or may not be also a location-aware device of the network.

Figure 10:
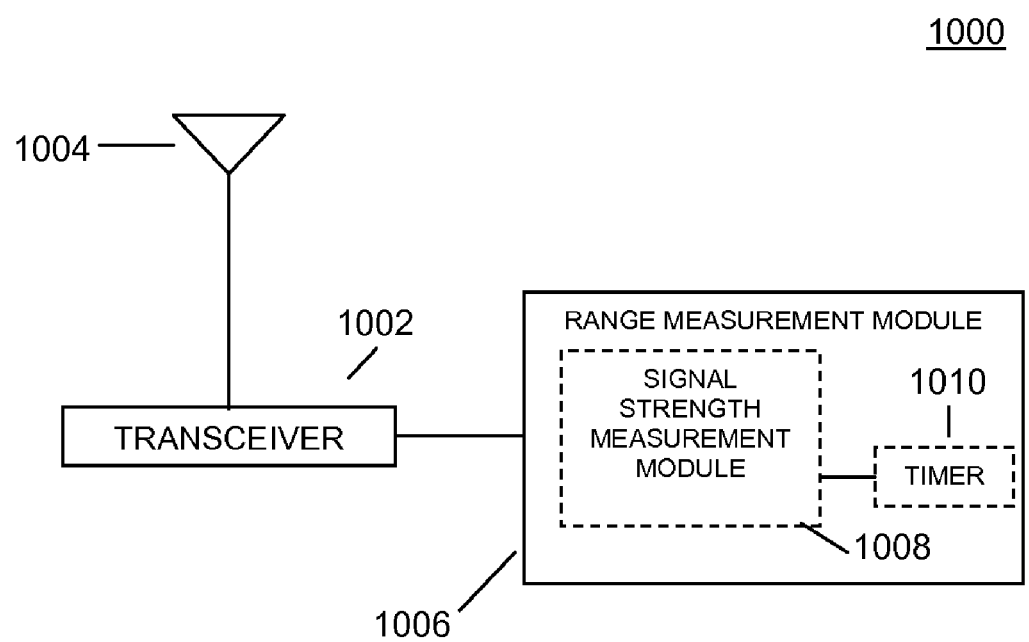
FIG. 10 is an exemplary diagram of a device of the wireless network, in accordance with embodiments of the present invention.

FIG. 10 illustrates a block diagram 1000 of an exemplary device, which in at least some instances will correspond to the devices described above. To facilitate wireless communications, the device can include a transceiver 1002 and an antenna 1004. One skilled in the art will recognize that such a block structure and arrangement will support various different types of wireless communications, which could be implemented without departing from the spirit and scope of the present invention.

In at least the illustrated embodiment, the exemplary unit 1000, additionally includes a range measurement module 1006, which allows for a measured range determination between other units within communication range; module 1006 may be integrated into the transceiver. As noted previously, several different methods could be incorporated for determining range, at least a couple of examples include a range measurement based upon a received signal strength indication, time of arrival estimate, angle of arrival estimate, and/or a time difference of arrival estimate. For purposes of supporting the determination of a received signal strength indication, the range measurement module 1006 could include a signal strength measurement module 1008. Alternatively or additionally, the range measurement module 1006 could include a timer 1010, which could be used in connection with determining a time of arrival estimate or a time difference of arrival estimate. The measured range information, is then used to determine a location estimate after the information is gathered in the device.

In at least some instances, the range measurement module 1006 may be implemented as one or more sets of prestored instructions, which are executed in a microprocessor. In other instances, the modules may be implemented using various electronic circuit elements. The block diagram illustrated in FIG. 10 may similarly correspond in some instances to one or more of the devices of the network, where it may be desirable for the units to similarly be able to obtain information necessary to determine their location or range between nearby units.

Figure 11:
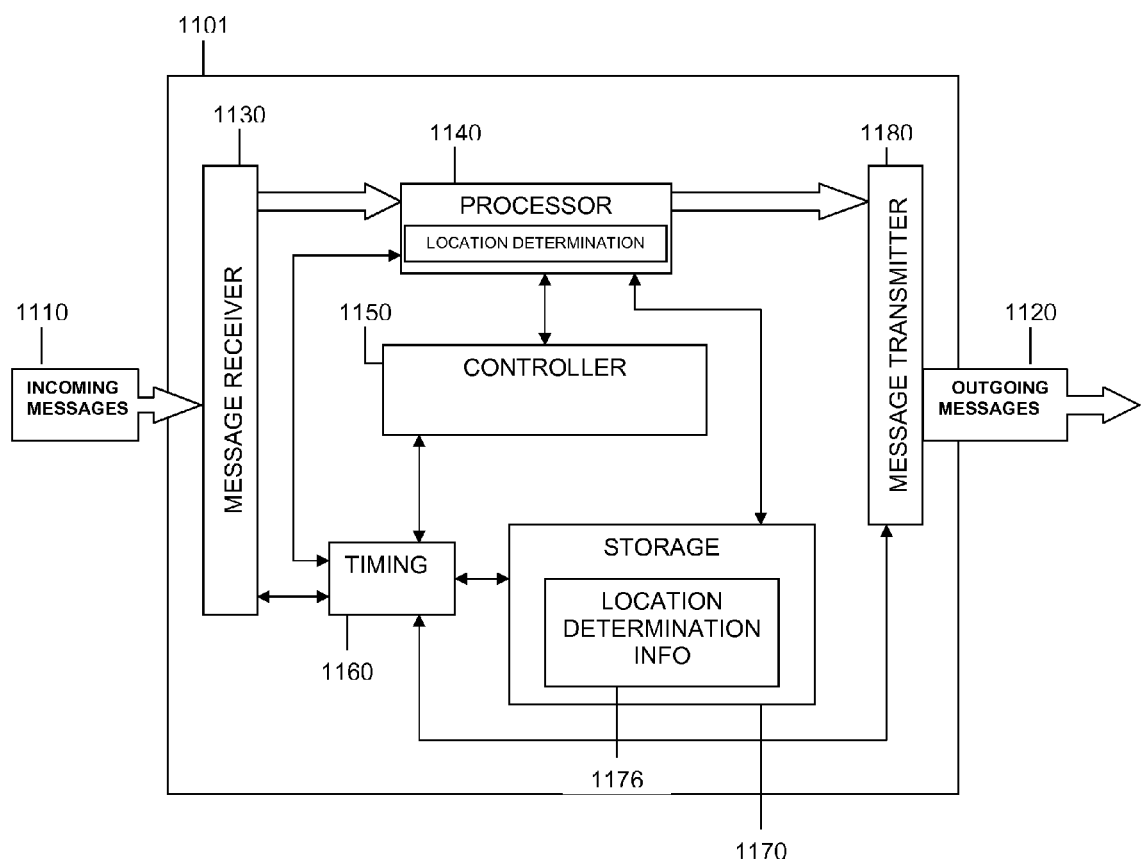
FIG. 11 is a block diagram that illustrates internal device functionality of a device of the wireless network, in accordance with embodiments of the present invention.

Each device within the network may contain a similar set of functionality for interacting with other wireless devices within the network. Referring now to block diagram 300 of FIG. 11, a functional view 1100 of a representative wireless device 1101 is shown. Device 1101 receives incoming messages 1110, through message receiver 1130, and processes the messages with processor 1140 under the control of controller 1150. Device timing is provided in block 1160, while storage for the device is located in block 1170. Outgoing messages 1120 are transmitted by message transmitter 1180. Timing block 1160 provides the clocking and synchronization for the channel assignments selected by the processor 1140. The timing block 1160 may also provide the reference clock for range determination. Storage block 1170 stores location determination information 1176. It will be recognized by one skilled in the art that the functionality represented in FIG. 11 is only representative of an external view of wireless device 1101, and additional functionality may be added, or the described functionality may be combined, without departing from the spirit and scope of the present invention.

Generally, the method and system for determining a location for a plurality of units can be used in connection with the location of any number of individual items among a group of items, one such example including the detection of items in a storage location or in a warehouse environment. However, the method and system for determining a location has additional applicability in other networks, wherein the determination of the location of individual elements is desired and a corresponding set of reference units and other non-reference units are available throughout the area to assist in determining a location estimate. At least one such example includes the location of devices such as one or more cellular telephones or other wireless communication devices located within a network.

Still further, the location determination module could be incorporated as part of the equipment for one or more groups of personnel operating in concert within a given area or environment. One such example includes emergency personnel. In this instance the circuitry and/or modules associated with each of the units could be located in one or more of a fire fighter's helmet, jacket, or other piece of equipment.

Further yet, the method and system for determining a location could be made to function with many different forms of wireless communications including communications systems, which use a cellular telephone radio transceiver, a cordless telephone radio transceiver, a wireless LAN connection, a short range radio transceiver, such as a Bluetooth transceiver, an infra-red communication transceiver, or other similar communication device. Still further there is no requirement that the units be completely physically detached from one another, for example, the method and system for determining a location could interact with an installed sprinkler system, which might include wireless transceivers, and/or which might be communicatively coupled to one another, via one or more common communication busses, which traverse the area containing the network.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method of determining a location of a location-incapable device of a plurality of devices of a decentralized wireless communication network comprising the location-incapable device, a plurality of location-aware devices communicatively coupled to the location-incapable device, and a location-capable device communicatively coupled to the location-incapable device, said method comprising:

the location-incapable device transmitting location determination information, relevant to the location of the location-incapable device in the network and sufficient to perform a calculation of the location of the location-incapable device, to the location-capable device;

the location-capable device receiving the location determination information and calculating the location of the location-incapable device in the network; and communicating the location of the location-incapable device.

2. The method of claim 1, wherein communicating the location of the location-incapable device comprises transmitting the location of the location-incapable device to at least one of the location-incapable device, a device of the plurality of devices, and a location function of the network.

3. The method of claim 1, wherein the location-capable device is a location-aware device of the plurality of location-aware devices of the network.

4. The method of claim 1, wherein the location determination information comprises measurements of one or more parameters related to distance made by the location-incapable device and location information of one or more of the plurality of location-aware devices communicatively coupled to the location-incapable device.

5. The method of claim 1, wherein the location-capable device does not calculate the location of the location-incapable device instead delegating said calculation to a second location-capable device of the network, further comprising:

the location-capable device transmitting the location determination information relevant to the location of the location-incapable device in the network to said second location-capable device of the network;

the second location-capable device calculating the location of the location-incapable device in the network using the location determination information relevant to the location of the location-incapable device; and the second location-capable device transmitting the location of the location-incapable device.

6. The method of claim 5, wherein the location-capable device delegates the calculation to the second location-capable device in response to a network condition of the network.

7. The method of claim 1, further comprising:

the location-incapable device selecting to transmit the location determination information to the location-capable device on the basis of one or more criteria.

8. The method of claim 1, wherein the location-incapable device is operable to calculate its location in the network but delegates said calculation to the location-capable device in response to a network condition of the network.

9. A method of determining a location of a location-incapable device of a decentralized wireless communication network comprising the location-incapable device, a plurality of location-aware devices communicatively coupled to the location-incapable device, and a location-capable device communicatively coupled to the location-incapable device, said method comprising:

the location-incapable device transmitting location determination information relevant to the location of the location-incapable device in the network and sufficient to perform a calculation of the location of the location-incapable device to the location-capable device of the plurality of location-capable devices of the network.

10. The method of claim 9, further comprising:

the location-incapable device receiving the location of the location-incapable device calculated by the location-capable device from the location determination information.

11. The method of claim 9, wherein the location determination information comprises measurements of one or more parameters related to distance made by the location-incapable device and location information of one or more of the plurality of location-aware devices communicatively coupled to the location-incapable device.

12. The method of claim 11, further comprising:

the location-incapable device measuring received waveforms from the one or more of the plurality of location-aware devices communicatively coupled to the location-incapable device to obtain the measurements.

13. The method of claim 12, further comprising the location-incapable device:

listening for message transmissions from the one or more location-aware devices; and receiving message transmissions from the one or more location-aware devices; and measuring waveforms of the received message transmissions from the one or more location-aware devices to obtain the measurements from the location-incapable device to the one or more location-aware devices.

14. The method of claim 12, further comprising the location-incapable device:

transmitting a request for message transmissions from the one or more location-aware devices;

receiving message transmissions from the one or more location-aware devices; and measuring waveforms of the received message transmissions from the one or more location-aware devices to obtain the measurements from the location-incapable device to the one or more location-aware devices.

15. The method of claim 9, further comprising:

the location-incapable device selecting to transmit the location determination information to the location-capable device on the basis of one or more criteria.

16. The method of claim 9, wherein the location-incapable device is operable to calculate its location in the network but delegates said calculation to the location-capable device in response to a network condition of the network.

17. A decentralized wireless communication network having a plurality of devices, comprising:

a location-incapable device inoperable to directly determine its location within the network;

a plurality of location-aware devices communicatively coupled to the location-incapable device;

a plurality of location-capable devices operable to perform location determination calculations and communicatively coupled to the location-incapable device;

wherein in response to receiving from the location-incapable device location determination information relevant to the location of the location-incapable device in the network, a location-capable device of the plurality of location-capable devices determining the location of the location-incapable device in the network using the location determination information.

18. The network of claim 17, wherein the location-capable device comprises a location determination element operable to calculate the location of the location-incapable device in the network using the location determination information.

19. The network of claim 17, wherein the location-capable device is operable to communicate the calculated location of the location-incapable device to at least one of the location-incapable device, a device of the plurality of devices of the network, and a location function of the network communicatively coupled to the location-capable device.

20. The network of claim 17, wherein the location determination information comprises measurements of one or more parameters related to distance made by the location-incapable device and location information of one or more of the plurality of location-aware devices communicatively coupled to the location-incapable device.

21. The network of claim 20, wherein the measurements are measured by the location-incapable device from waveforms received from one or more of the plurality of location-aware devices communicatively coupled to the location-incapable device.

22. The network of claim 17, wherein the location-capable device is a location-aware device of the plurality of location-aware devices.

23. The network of claim 17, wherein the network is a 802.15.4 system.

24. The network of claim 17, wherein the location-incapable device is operable to calculate its location in the network but delegates said calculation to the location-capable device in response to a network condition of the network.

25. The device of claim 17, wherein the location-capable device does not calculate the location of the device and delegates said calculation to a second location-capable device of the plurality of devices of the network.

26. The device of claim 25, wherein delegation by the location-capable device to the second location-capable device occurs in response to a network condition of the network.

* * * * *